No. 672,034. Patented Apr. 16, 1901.
T. CUNNINGHAM.
STEAM OR OTHER PIPE.
(Application filed Dec. 26, 1899.)

(No Model.)

Witnesses
J. M. Dolan
M. E. Flaherty

Inventor
Thomas Cunningham
by his attys
Clarke & Raymond

UNITED STATES PATENT OFFICE.

THOMAS CUNNINGHAM, OF WENHAM, MASSACHUSETTS.

STEAM OR OTHER PIPE.

SPECIFICATION forming part of Letters Patent No. 672,034, dated April 16, 1901.

Application filed December 26, 1899. Serial No. 741,547. (No model.)

*To all whom it may concern:*

Be it known that I, THOMAS CUNNINGHAM, a citizen of the United States, residing at Wenham, in the county of Essex and State of Massachusetts, have invented a new and useful Improvement in Steam or other Pipes, of which the following is a full, clear, and exact description, reference being had to the accompanying drawings, forming a part of this specification, in explaining its nature.

The invention relates to steam or other pipe comprising a tube of relatively thin homogeneous metal which is provided with independent metal coupling-flanges at each end, secured thereto as hereinafter specified.

Figure 1:
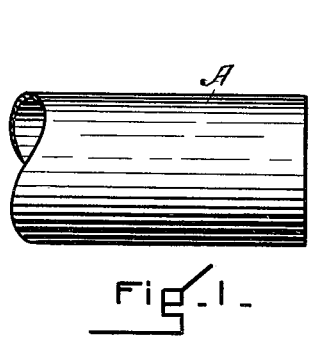
Figure 2:
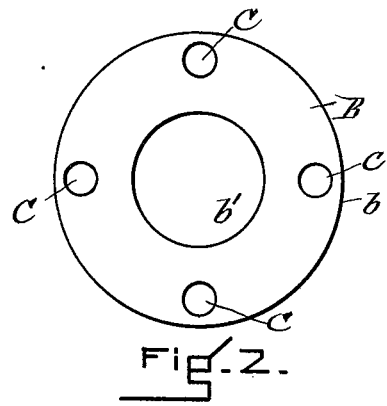
Figure 3:
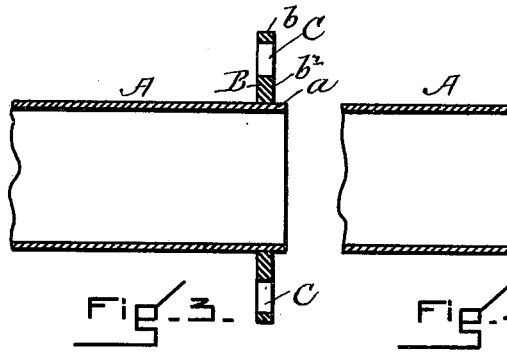
Figure 4:
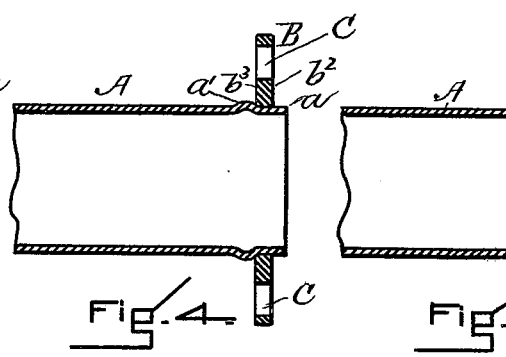
Figure 5:
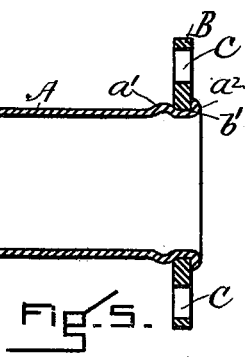
Figure 6:
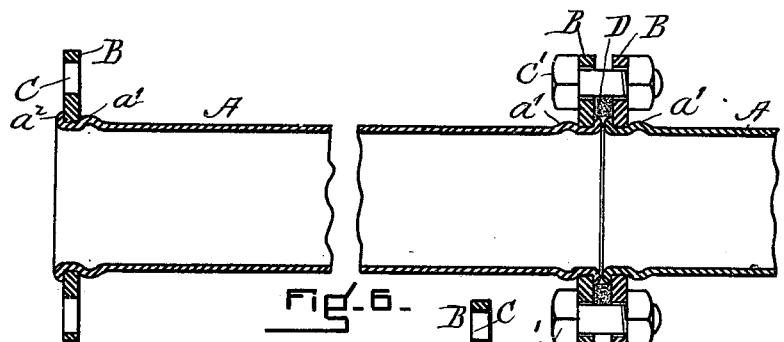
Figure 7:
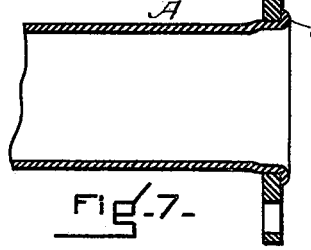

In the drawings, Figure 1 is a view in elevation of the end of a pipe. Fig. 2 is a view in elevation of a coupling-flange to be united thereto. Fig. 3 is a view in section of the pipe and the flange, representing the flange as placed upon the end of the pipe. Fig. 4 is a view of the same parts, representing the pipe as provided with a flange-retaining shoulder and a projecting bead-forming end. Fig. 5 is a view in section of the completed pipe and flange. Fig. 6 is a view in section to illustrate the manner of connecting or joining the pipes. Fig. 7 is a view illustrating a modification, reference to which is hereinafter made.

In the drawings, A represents a pipe of homogeneous metal, preferably wrought iron or steel. At each end there is secured to it a metallic coupling-flange B. This flange has the circular outer edge $b$ and a hole $b'$ of a size to snugly fit the pipe A. It is placed upon the end of the pipe as represented so that a short section $a$ of the pipe extends beyond its outer surface $b^2$. The tube is then expanded beyond the inner surface $b^3$ of the flange to provide the enlargement $a'$ upon said side of the flange and which furnishes a shoulder, against which it is set, and the end $a$ of the pipe is then peened or beaded over upon the outer surface of the flange, forming a continuous rib or bead $a^2$ thereon around the hole $b'$. Each end of the pipe is thus supplied with a coupling-flange, and the pipe-sections thus made are coupled together by providing the flanges with holes C for the reception of coupling-bolts $C'$, which pass through the holes and by means of nuts bolt the flanges together. To make a tight joint, a gasket D, of compressible packing, is inserted between the bead or rib $a^2$ and the bolt-holes and is compressed between the flanges by the bolts.

In Fig. 7 I have shown the coupling-flange as secured to the pipe by expanding the end of the pipe against the inner edge of the coupling-flange about its hole $b'$ and by turning outward the end of the pipe to form a bead upon the outer surface of the flange like that above described. There is thus substituted for the shoulder $a'$ the setting of the pipe against the flange by the expansion of the pipe.

The invention is applicable to the manufacture of pipes for conducting steam, water, oil, and other purposes. Only such steel or iron or other metal may be used in the manufacture of the pipes as may be capable of being manipulated in the manner specified.

The invention is especially adapted for use in connection with wrought-iron pipe of the character of boiler-tubing, and old boiler-tubing which is now a refuse product may be converted into marketable pipe of the first quality in this manner.

The advantages of the invention arise from the fact that a convenient means is provided for strongly uniting coupling-flanges to pipe-sections and in a manner not to weaken the pipe or the flanges, thereby enabling much thinner and wrought-iron pipe to be used for steam and other purposes than is now possible.

Having thus fully described my invention, I claim and desire to secure by Letters Patent of the United States—

1. The improved steam and other pipe herein described, the same comprising a pipe-link, A, of uniform thickness throughout, and an independent coupling-flange, B, having a smooth interior adapted to slide over the end of said pipe length, and being provided with suitable bolt-holes, said pipe having an enlargement made independently of the flange and adapted to furnish a rear support for said flange, and the end of said pipe being spread outwardly whereby the said flange is held between said enlargement and said outwardly-turned end, as and for the purposes described.

2. The combination of two pipe-sections,

A, A', each provided with an enlargement near its end, as described, and having a flange composed of a flat disk having an opening to pass over said pipe, said enlargement being made independent of said flange and said flange abutting against said enlargement, the end of each section being turned upward and outward against said flange, whereby said flange is firmly secured to said pipe-section, coupling-bolts passing through said flanges, and a gasket or packing interposed between said flanges and compressed by said coupling-bolts, as set forth.

THOMAS CUNNINGHAM.

Witnesses:
F. F. RAYMOND, 2d,
J. M. DOLAN.